(12) United States Patent
Duzly et al.

(10) Patent No.: US 9,645,742 B2
(45) Date of Patent: *May 9, 2017

(54) STORAGE MODULE AND HOST DEVICE FOR STORAGE MODULE DEFRAGMENTATION

(71) Applicant: SanDisk Technologies LLC, Plano, TX (US)

(72) Inventors: Yacov Duzly, Raanana (IL); Hadas Oshinsky, Kfar Saba (IL); Shahar Bar-Or, Raanana (IL); Judah Gamliel Hahn, Ofra (IL)

(73) Assignee: SANDISK TECHNOLOGIES LLC, Plano, TX (US)

( * ) Notice: Subject to any disclaimer, the term of this patent is extended or adjusted under 35 U.S.C. 154(b) by 44 days.

This patent is subject to a terminal disclaimer.

(21) Appl. No.: 14/249,096

(22) Filed: Apr. 9, 2014

(65) Prior Publication Data

US 2015/0220552 A1 Aug. 6, 2015

Related U.S. Application Data

(60) Provisional application No. 61/936,170, filed on Feb. 5, 2014.

(51) Int. Cl.
*G06F 12/06* (2006.01)
*G06F 3/06* (2006.01)
(Continued)

(52) U.S. Cl.
CPC ............ *G06F 3/061* (2013.01); *G06F 3/0643* (2013.01); *G06F 3/0679* (2013.01);
(Continued)

(58) Field of Classification Search
CPC ............ G06F 12/0246; G06F 12/0253; G06F 12/0238; G06F 12/0223; G06F 12/023; G06F 12/0261; G06F 12/0276
See application file for complete search history.

(56) References Cited

U.S. PATENT DOCUMENTS

| 8,818,966 B1 | 8/2014 | Nanda | |
|---|---|---|---|
| 2005/0091445 A1* | 4/2005 | Chang | G06F 12/0246 711/103 |

(Continued)

OTHER PUBLICATIONS

NVM Express, Jul. 2, 2014, Revision 1.1b, pp. 124-125.*

(Continued)

*Primary Examiner* — Reginald Bragdon
*Assistant Examiner* — Thanh Vo
(74) *Attorney, Agent, or Firm* — Brinks Gilson & Lione

(57) ABSTRACT

A storage module and host device for storage module defragmentation are disclosed. In one embodiment, a host controller sends a storage module a first set of logical block addresses of a file stored in the storage module. The host controller receives a metric from the storage module indicative of a fragmentation level of the file in physical blocks of memory in the storage module. If the metric is greater than a threshold, the host controller reads the file and then writes it back to the storage module using a different set of logical block addresses. To avoid sending the file back and forth, in another embodiment, the host controller sends the fragmentation threshold and the different set of logical block addresses to the storage module. The storage module then moves the file itself if the metric indicative of the fragmentation level is greater than the threshold. Other embodiments are provided.

31 Claims, 9 Drawing Sheets

(51) Int. Cl.
*G06F 12/02* (2006.01)
*G06F 17/30* (2006.01)

(52) U.S. Cl.
CPC ............ *G06F 3/0688* (2013.01); *G06F 12/02* (2013.01); *G06F 12/023* (2013.01); *G06F 17/30* (2013.01); *G06F 17/30135* (2013.01); *G06F 2206/1014* (2013.01); *G06F 2212/1044* (2013.01)

(56) References Cited

U.S. PATENT DOCUMENTS

| | | | |
|---|---|---|---|
| 2005/0228963 A1 | 10/2005 | Rothman et al. | |
| 2005/0256696 A1* | 11/2005 | Gooding | G06F 17/5027 703/23 |
| 2007/0143566 A1* | 6/2007 | Gorobets | G06F 12/0292 711/202 |
| 2008/0010395 A1 | 1/2008 | Mylly et al. | |
| 2008/0307192 A1 | 12/2008 | Sinclair et al. | |
| 2009/0055620 A1 | 2/2009 | Feldman et al. | |
| 2009/0157948 A1* | 6/2009 | Trichina | G06F 12/0246 711/103 |
| 2009/0172040 A1* | 7/2009 | Mosek | G06F 3/0605 |
| 2010/0146195 A1* | 6/2010 | Lee | G06F 3/0616 711/103 |
| 2010/0312983 A1 | 12/2010 | Moon et al. | |
| 2011/0119455 A1 | 5/2011 | Tsai et al. | |
| 2011/0188319 A1* | 8/2011 | Harada | G11C 16/06 365/185.22 |
| 2011/0225215 A1* | 9/2011 | Ukai | G06F 17/302 707/821 |
| 2013/0111199 A1* | 5/2013 | Watanabe | G06F 9/4406 713/1 |
| 2013/0282955 A1 | 10/2013 | Parker et al. | |
| 2014/0223083 A1* | 8/2014 | Park | G06F 12/0246 711/103 |
| 2014/0359198 A1* | 12/2014 | Zaltsman | G06F 3/06 711/103 |

OTHER PUBLICATIONS

International Search Report and Written Opinion for PCT/US2015/012585 dated Jul. 6, 2015, 20 pages.
Application as filed for U.S. Appl. No. 13/753,144 entitled, "Logical Block Address Remapping", filed Jan. 29, 2013, 22 pages.
Office Action for U.S. Appl. No. 14/249,049 dated Nov. 5, 2015, 18 pages.
Office Action for U.S. Appl. No. 14/249,063 dated Nov. 18, 2015, 14 pages.
Office Action for U.S. Appl. No. 14/249,082 dated Nov. 5, 2015, 22 pages.
Invitation to Pay Additional Fees for PCT/US2015/012585 dated Apr. 22, 2015, 5 pages.
Office Action for U.S. Appl. No. 14/249,049 dated May 18, 2016, 16 pages.
Office Action for U.S. Appl. No. 14/249,063 dated May 18, 2016, 12 pages.
Office Action for U.S. Appl. No. 14/249,082 dated May 18, 2016, 22 pages.

* cited by examiner

STORAGE MODULE AND HOST DEVICE FOR STORAGE MODULE DEFRAGMENTATION

CROSS-REFERENCE TO RELATED APPLICATION

This application claims the benefit of U.S. provisional patent application No. 61/936,170, filed Feb. 5, 2014, which is hereby incorporated by reference.

BACKGROUND

Fragmentation of files due to host fragmentation or storage module fragmentation can degrade system performance. With host fragmentation, files are scattered across many non-consecutive logical block address (LBA) ranges of the storage module. So, the more LBA ranges are used to store a file, the more fragmented the file becomes. Further, in some file systems, such as EXT4, the file allocation table (FAT) is mixed with stored data. Reading a fragmented file in such a system requires more operations, as the structure of the file is more complicated. This can degrade read performance.

With storage module fragmentation, files are scattered among many physical blocks in memory. The more physical blocks that are allocated for the same file, the more fragmented the file is. Because a fragmented file often does not occupy the entire physical block, a physical block that stores part of a fragmented file will often store data of other files. So, when a host deletes a file that is fragmented over several physical blocks, this may result in fewer free blocks than intended, as the blocks still hold data for other files. Because such a file deletion will leave "holes" of free space in an otherwise-occupied physical block, the storage module will need to perform several "housekeeping" operations to create a free block, which can degrade system performance.

Additionally, in some environments, such as in mobile computing systems, when a file is fragmented by the storage module, the host does not know how fragmented the file is, so it does not know what action is needed to attempt to defragment the file. Further, while a host is aware of the host-fragmentation problem and can attempt to solve it by moving a scattered file to consecutive LBA ranges, such moving can actually degrade performance because of the storage fragmentation problem.

Overview

Embodiments of the present invention are defined by the claims, and nothing in this section should be taken as a limitation on those claims.

By way of introduction, various embodiments relate to a storage module and host device for storage module defragmentation. In one embodiment, a host controller sends a storage module a first set of logical block addresses of a file stored in the storage module. The host controller receives a metric from the storage module indicative of a fragmentation level of the file in physicals blocks of memory in the storage module. If the metric is greater than a threshold, the host controller reads the file and then writes it back to the storage module using a different set of logical block addresses. To avoid sending the file back and forth, in another embodiment, the host controller sends the fragmentation threshold and the different set of logical block addresses to the storage module. The storage module then moves the file itself if the metric indicative of the fragmentation level is greater than the threshold. To perform this embodiment on a plurality of files, the host controller can send the information about the files on a file-by-file basis to the storage module or can send the information as a group to the storage module. In another embodiment, a host controller sends, to the storage module, a set of logical block addresses of a file stored in the storage module, and the storage module generates, and sends to the host controller, a metric indicative of a level of fragmentation level of the file in physical blocks of memory in the storage module. In yet another embodiment, a host controller reads a file stored in a storage module and writes it back to the storage module according to a specified writing mode.

Other embodiments are possible, and each of the embodiments can be used alone or together in combination. Accordingly, various embodiments will now be described with reference to the attached drawings.

BRIEF DESCRIPTION OF THE DRAWINGS

FIGS. 3A and 3B illustrate a storage module fragmentation problem of an embodiment.

DETAILED DESCRIPTION OF THE PRESENTLY PREFERRED EMBODIMENTS

As mentioned above, a host typically does not know how fragmented a file is in physical blocks of memory in the storage module, so it does not know what action is needed to attempt to defragment the file. The following embodiments can be used to address the storage module fragmentation problem discussed above by giving the host an understanding of storage module fragmentation and providing the host with a set of tools to handle storage device fragmentation with various levels of involvement. Before turning to these and other embodiments, the following paragraphs provide a discussion of an exemplary storage module and host that can be used with these embodiments. Of course, these are just examples, and other suitable types of storage modules can be used.

Figure 1:
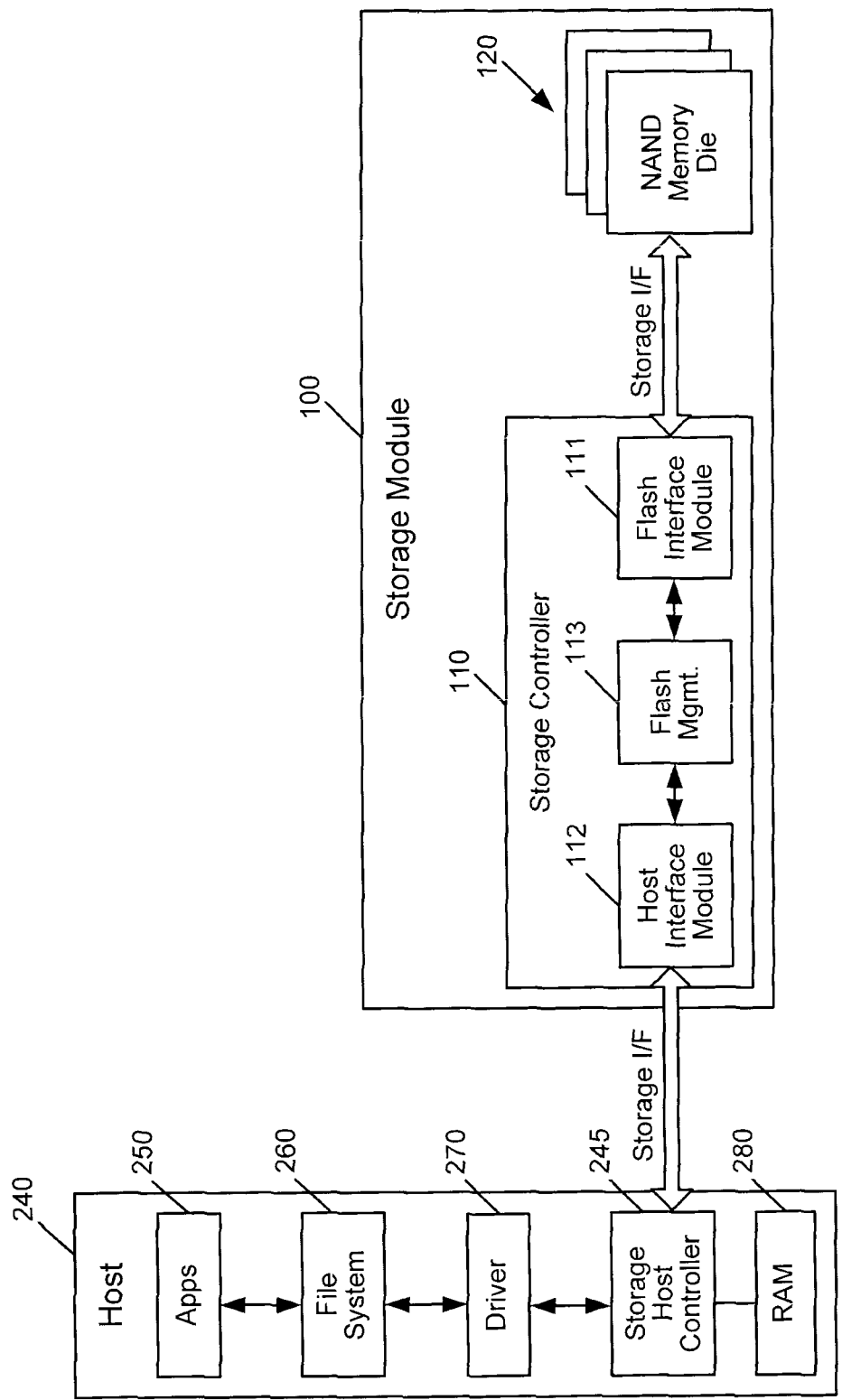
FIG. 1 is a block diagram of an exemplary storage module of an embodiment.

As illustrated in FIG. 1, a storage module 100 of one embodiment comprises a storage controller 110 and non-volatile memory 120 (here, one or more NAND memory die, although other type of memory technology can be used). The storage controller 110 comprises a memory interface 111 (a Flash Interface Module) for interfacing with the non-volatile memory 120 and a host interface module 112 for placing the storage module 100 operatively in communication with a host controller 245. As used herein, operatively in communication with could mean directly in communication with or indirectly in communication with through one or more components, which may or may not be shown or described herein, in a wired or wireless fashion. FIG. 1 also shows the storage module 100 in communication with a host 240 via a storage device interface using a storage protocol such as, for example, eMMC, UFS, PCI Express, DDR-3/4, or SATA. The host 240 comprises applications 250, a file system 260, a driver 270, and a memory (e.g., RAM) 280, although other or different components can be used. Also, as mentioned above, the host 240 contains a host controller 245, and it should be understood that actions taken by the host with respect to the storage module 100 can be performed using the host controller 245. Different storage module-host configurations can be used, as shown in FIGS. 2A and 2B.

Figure 2A:
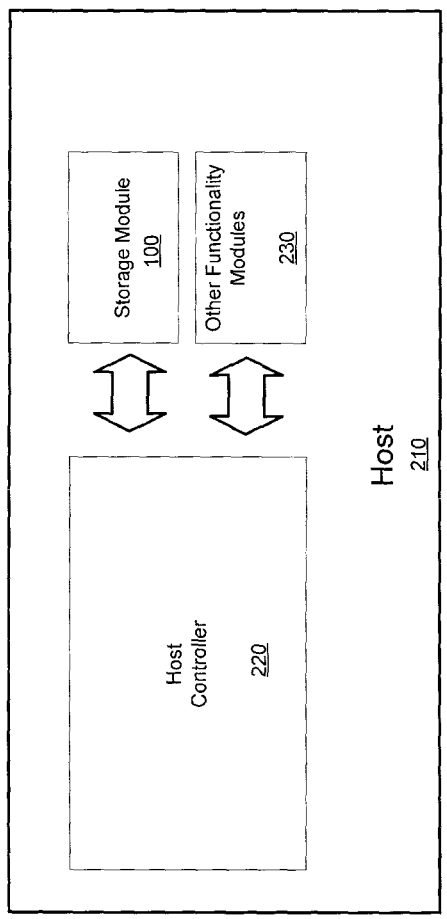
FIG. 2A is a block diagram of a host of an embodiment, where the exemplary storage module of FIG. 1 is embedded in the host.

As shown in FIG. 2A, the storage module 100 can be embedded in a host 210 having a host controller 220. That is, the host 210 embodies the host controller 220 and the storage module 100, such that the host controller 220 interfaces with the embedded storage module 100 to manage its operations. (It should be noted that while the host controller 220 can control the storage module 100, the storage module 100 can have its own controller to control its internal memory operations.) For example, the storage module 100 can take the form of an iNAND™ eSD/eMMC embedded flash drive by SanDisk Corporation, or, more generally, any type of solid state drive (SSD), a hybrid storage device (having both a hard disk drive and a solid state drive), and a memory caching system. The host controller 220 can interface with the embedded storage module 100 using, for example, an eMMC host interface or a UFS interface. The host 210 can take any form, such as, but not limited to, a mobile phone, a tablet computer, a digital media player, a game device, a personal digital assistant (PDA), a mobile (e.g., notebook, laptop) personal computer (PC), or a book reader. As shown in FIG. 2A, the host 210 can include optional other functionality modules 230. For example, if the host 210 is a mobile phone, the other functionality modules 230 can include hardware and/or software components to make and place telephone calls. As another example, if the host 210 has network connectivity capabilities, the other functionality modules 230 can include a network interface. Of course, these are just some examples, and other implementations can be used. Also, the host 210 can include other components (e.g., an audio output, input-output ports, etc.) that are not shown in FIG. 2A to simplify the drawing.

Figure 2B:
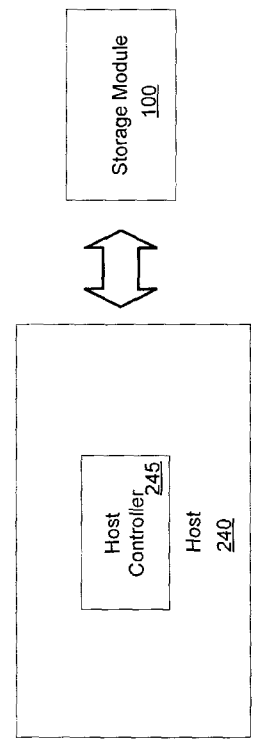
FIG. 2B is a block diagram of the exemplary storage module of FIG. 1 removably connected to a host, where the storage module and host are separable, removable devices.

As shown in FIG. 2B, instead of being an embedded device in a host, the storage module 100 can have physical and electrical connectors that allow the storage module 100 to be removably connected to a host 240 (having a host controller 245) via mating connectors. As such, the storage module 100 is a separate device from (and is not embedded in) the host 240. In this example, the storage module 100 can be a handheld, removable memory device, such as a Secure Digital (SD) memory card, a microSD memory card, a Compact Flash (CF) memory card, or a universal serial bus (USB) device (with a USB interface to the host), and the host 240 is a separate device, such as a mobile phone, a tablet computer, a digital media player, a game device, a personal digital assistant (PDA), a mobile (e.g., notebook, laptop) personal computer (PC), or a book reader, for example.

In FIGS. 2A and 2B, the storage module 100 is in communication with a host controller 220 or host 240 via the host interface module 112 shown in FIG. 1. The host interface module 112 can take any suitable form, such as, but not limited to, an eMMC host interface, a UFS interface, and a USB interface. The host interface module 110 in the storage module 110 conveys memory management commands from the host controller 220 (FIG. 2A) or host 240 (FIG. 2B) to the storage controller 110, and also conveys memory responses from the storage controller 110 to the host controller 220 (FIG. 2A) or host 240 (FIG. 2B). Also, it should be noted that when the storage module 100 is embedded in the host 210, some or all of the functions described herein as being performed by the storage controller 110 in the storage module 100 can instead be performed by the host controller 220.

Returning to FIG. 1, the storage controller 110 comprises a flash management module 113, which can contain a central processing unit (CPU) 113 running software and/or hardware modules to manage the memory 120 (e.g., performing logical-to-physical address mapping, etc.). The storage controller 110 can be implemented in any suitable manner. For example, the storage controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Suitable controllers can be obtained from SanDisk or other vendors. The storage controller 110 can be configured with hardware and/or software to perform the various functions described below and shown in the flow charts.

The non-volatile memory 120 can also take any suitable form. For example, in one embodiment, the non-volatile memory 120 takes the form of a solid-state (e.g., flash) memory and can be one-time programmable, few-time programmable, or many-time programmable. The non-volatile memory 120 can also use single-level cell (SLC), multiple-level cell (MLC), triple-level cell (TLC), or other memory technologies, now known or later developed. Also, the non-volatile memory 120 can be a two-dimensional memory or a three-dimensional memory.

Figures 3A, 3B:
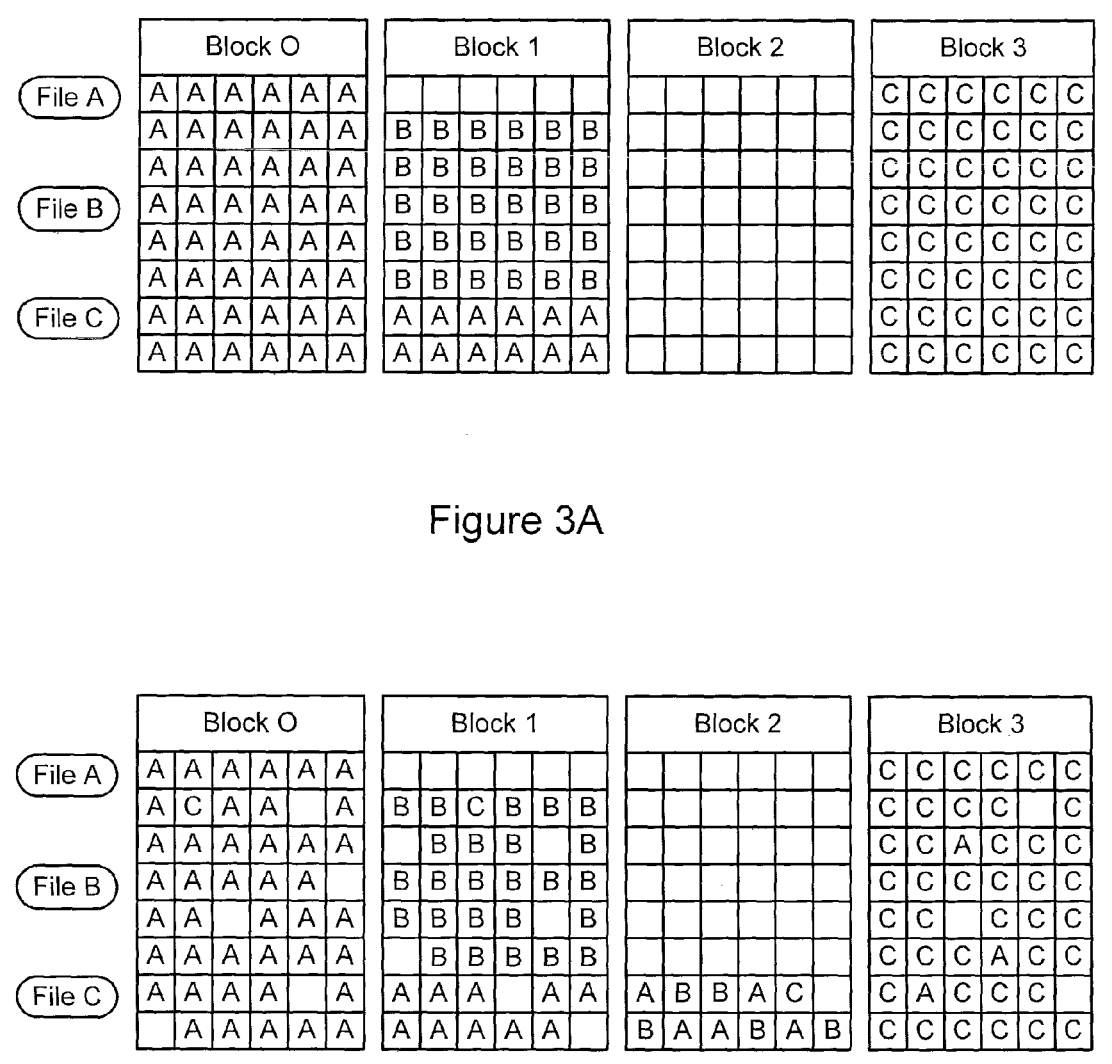

As mentioned above, a host typically does not know how fragmented a file is in physical blocks of memory in the storage module, so it does not know what action is needed to attempt to defragment the file. FIGS. 3A and 3B illustrate the storage module fragmentation problem. In FIG. 3A, there are four physical blocks of memory, and three files stored therein. The squares denote the smallest writing units. File A is contained in blocks 0 and 1, File B is contained entirely in block 1 (with some free space available in block 1), and File C in contained entirely in block 3 (with no free space available). Block 2 is completely empty. FIG. 3B shows the storage of the same three files identical in size, but, this time, the storage of these files is more fragmented. Specifically, parts of all four files are stored in each of the blocks. The following embodiments can be used by a host to address storage module fragmentation.

Figure 4:
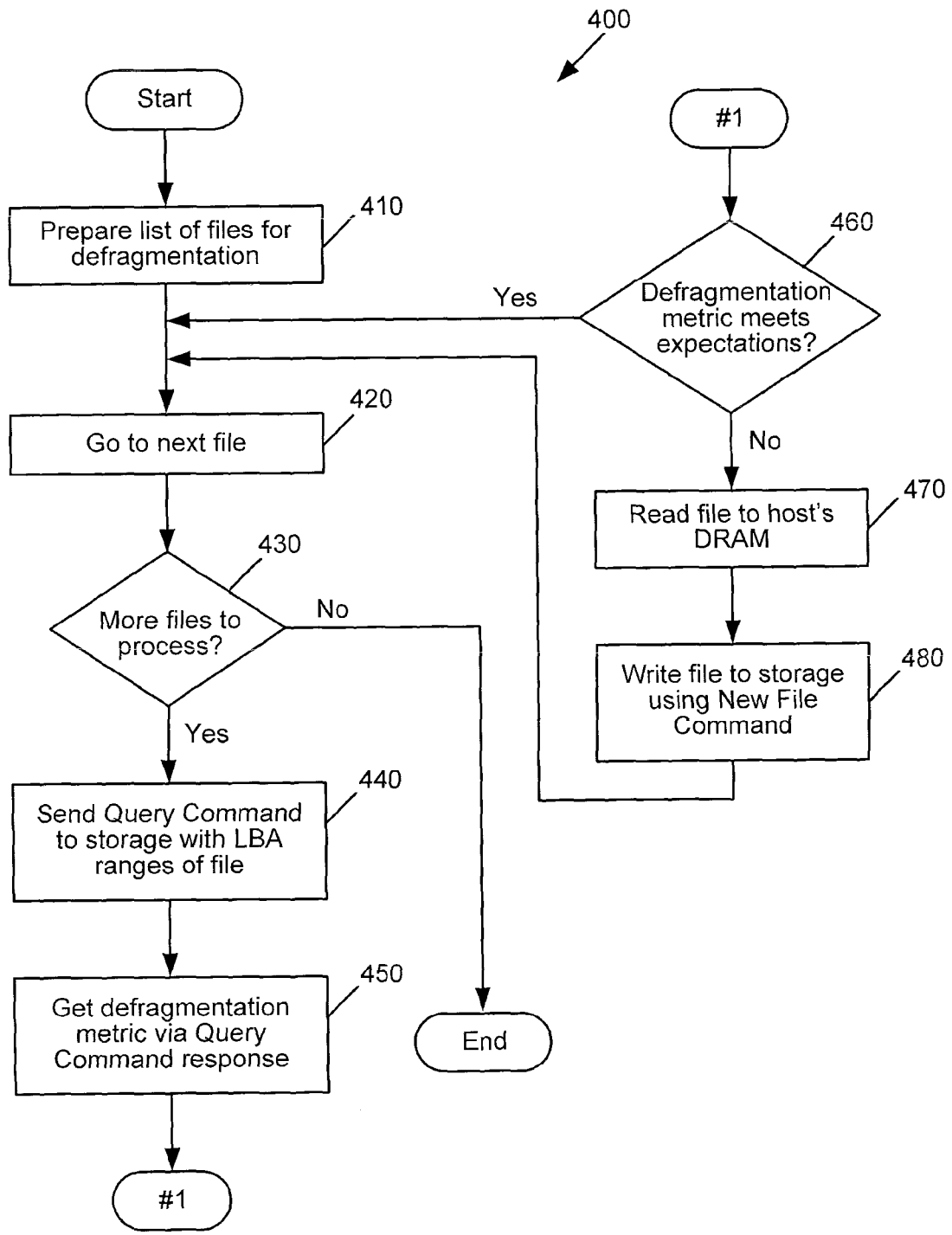
FIG. 4 is a flow chart of an embodiment for providing a host with information about storage module fragmentation and for reducing the fragmentation of a file.

Typically, a host does not have insight into the level of storage module fragmentation. So, in one embodiment, a new communication between the host 240 and storage module 100 is provided. This will be illustrated in conjunction with the flow chart 400 of FIG. 4. As shown in FIG. 4, the host 240 prepares a list of files for defragmentation (act 410) and goes through this list of files on a file-by-file basis (acts 420, 430). For each file, the host 240 sends a query command to the storage module 100 with the logical block address (LBA) ranges of the file (act 440). In response to this query, the storage module 100 provides the host 240 with a defragmentation metric for the file (act 450). That is, the defragmentation metric is part of a response to the query command (this embodiment assumes a storage protocol is used in which for every command, there is a response.)

As used herein, a defragmentation metric reflects the level of fragmentation for a file, and its value relates to the degree of such fragmentation. An example of a defragmentation metric can include the number of physical blocks containing the file. So, in the example shown in FIG. 3A, the fragmentation metric is two blocks for file A, one block for file B, and one block for file C. In contrast, in the more-fragmented example shown in FIG. 3B, the fragmentation metric is four blocks for file A, two blocks for file B, and four blocks for file C. Of course, the number of physical blocks containing a file is just one example of a defragmentation metric. Other examples include, but are not limited to, a hot/cold indication, and a mapping efficiency indication. A hot/cold indication describes how long ago the data was written. For example, a file written a year ago can be considered cold, whereas a file written five minutes ago can be considered hot. From the storage module's point of view, it would be preferred to perform fragmentation on cold files before hot files since hot files still might be changed by the host. Mapping efficiency describes the amount of excessive reads from management tables that are required in order to find a physical location. This metric refers to the fact that flash management software contains one or more tables mapping logical addresses to physical address. When the mapping unit is very small (e.g., 4 KB), the logical-to-physical table (L2P) of a typical storage (e.g., 32 GB) can be very large (e.g., 8 MB). For practical reasons such as cost and power, this table is not stored in the RAM of the storage controller 110 and has to be written to the NAND memory dies 120. The L2P table can be scattered among several NAND memory dies, and, within each die, parts of the tables can be in different blocks and pages. In some situations of storage fragmentation, not only is the data fragmented, but the L2P table(s) are fragmented as well. In this case, reading the file will involve additional reads from the L2P table before reading/writing the data. These additional "control" reads degrade the storage performance.

Based on the received defragmentation metric, the host 240 can choose to take various actions. For example, as shown in FIG. 4, the host 240 can determine whether the received defragmentation metric meets an expectation (e.g., greater than a predetermined or dynamic threshold) (act 460). If the metric meets the expectation (such as file A in FIG. 3A), the host 240 can inquire about the next file (acts 420 et seq.). However, if the metric does not meet the expectation (such as file A in FIG. 3B), the host 240 can move the file to another location in the memory 120 of the storage module 100 to decrease fragmentation of the file. To do this, the host 240 can read the file from the existing physical block into memory in the host 240 (e.g., the host's RAM 280 or other volatile or non-volatile memory in the host 240) (act 470). Then, the host 240 writes the file back to the storage module 100 using a new file command (act 480), so that the file will occupy fewer physical blocks (or, ideally, with minimal storage fragmentation). To do this, the host can send a list of LBAs reflecting one new file (preferably, one consecutive range of LBAs). The host 240 can then also instruct the storage module 100 as to the writing mode. For example, the host 240 can instruct the storage module 100 to write in a "best effort mode," in which the storage module tries writing the file to a minimal number of physical blocks but without any guarantee. Along with this type of write mode, the host 240 can provide the storage module 100 with information about the file type (e.g., log, temp, JPG, OS), and the storage module 100 can determine what best effort should be made for that file type. For example, the storage module 100 may make a better effort trying to write an OS file than a log file. Alternatively, the host 240 can instruct the storage module 100 to write in a "warranted mode," in which the storage module 100 shall perform any housekeeping required before writing to assure minimal number of physical blocks. In either mode, after the file has been written, the storage module 100 can return the fragmentation metric for the new file to the host 240. The host 240 can use this metric to see if the result of a "best effort" write was satisfactory. If it was not, the host 240 can reissue the write as a "warranted" write.

The following chart is a high-level description of the commands and response arguments for the embodiment discussed above. Of course, this is merely one example, and other arguments can be used.

| Command Name | Command Arguments | Response Arguments |
|---|---|---|
| Query CMD - query of existing file command | Number of LBA ranges; N LBA range #1: (start LBA, end LBA) . . . LBA range #N: (start LBA, end LBA) | Fragmentation metric #1 . . . Fragmentation metric #K |
| New file CMD - writing new file command in a defragmented way | Number of LBA ranges; N LBA range #1: (start LBA, end LBA) . . . LBA range #N: (start LBA, end LBA) Mode (e.g., best effort or warranted) File type (e.g., log, temp., JPG, OS) | Fragmentation metric #1 . . . Fragmentation metric #K |

Figure 5:
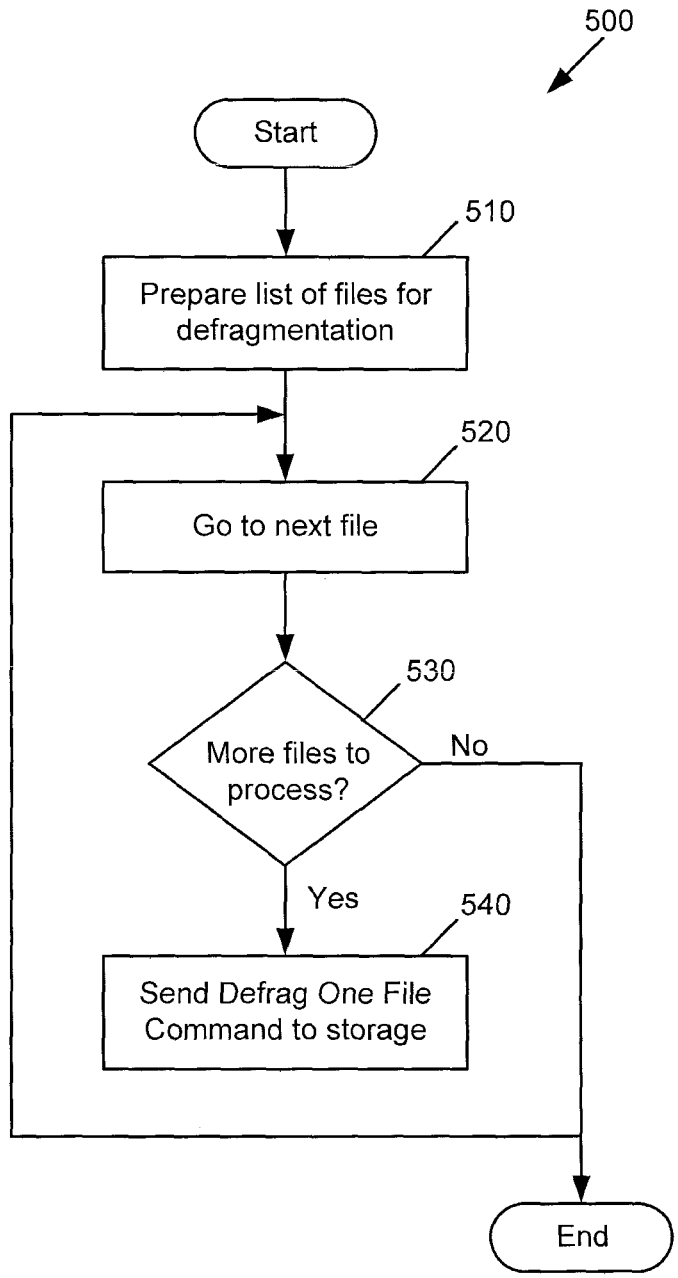
FIG. 5 is a flow chart of a method of an embodiment for reducing the fragmentation of a file without transferring the file between a storage module and a host.

As can be seen by the above examples, this embodiment allows the host 240 to have visibility into the storage module fragmentation for a given file and provides the host 240 with a set of tools to handle storage device fragmentation with various levels of involvement. For example, the host 240 can read and write the file back to the storage module 100 with a better fragmentation metric (e.g., fewer number of physical blocks), if desired. In another embodiment, instead of the host 240 reading the file out of the storage module 100 and then writing the file back to the storage module 100, this defragmentation process is performed without moving the file back and forth between the storage module 100 and the host 240, thereby avoiding the data transfer on the bus. FIG. 5 is a flow chart 500 that illustrates this embodiment. As shown in FIG. 5, the host 240 prepares a list of files for defragmentation (act 510) and goes through this list of files on a file-by-file basis (acts 520, 530). For each file, the host 240 provides a list of LBA ranges reflecting the current storage of the file, as well as a potential new list of LBA ranges for the new location of the file (act 540). The storage module 100 then moves the data of the file to a smaller number (preferably, the minimal number) of physical blocks and confirms the mapping of new LBA ranges. The host 240 can also provide the metric expectation, so the storage module 100 can determine whether or not to perform the defrag operation, as well as the write mode (e.g., best effort (along with optional file type) or warranted), if the defrag operation is to be performed. Optionally, the storage module 100 can first respond with the estimated fragmentation metric for the new and old ranges to allow the host 240 to approve the fragmentation before it takes place (based on comparing the old and new metrics).

The advantage of this embodiment over the previous embodiment is that the host implementation is simpler because the transfer of unnecessary data on host-storage bus is eliminated. In this case, the file system on the host 240 has the knowledge on each file, and it sends a Defrag File command one by one. The following chart is a high-level description of the commands and response arguments for this embodiment. Of course, this is merely one example, and other arguments can be used.

| Command Name | Command Arguments | Response Arguments |
| --- | --- | --- |
| Defrag One File CMD - defrag of existing file command | Existing LBA ranges of the file New LBA ranges (if desired to be different from existing) Mode (e.g., best effort or warranted) Metric expectation File type (e.g., log, temp., JPG, OS) | Completion status Fragmentation metric #1 . . . Fragmentation metric #K |

Figure 6:
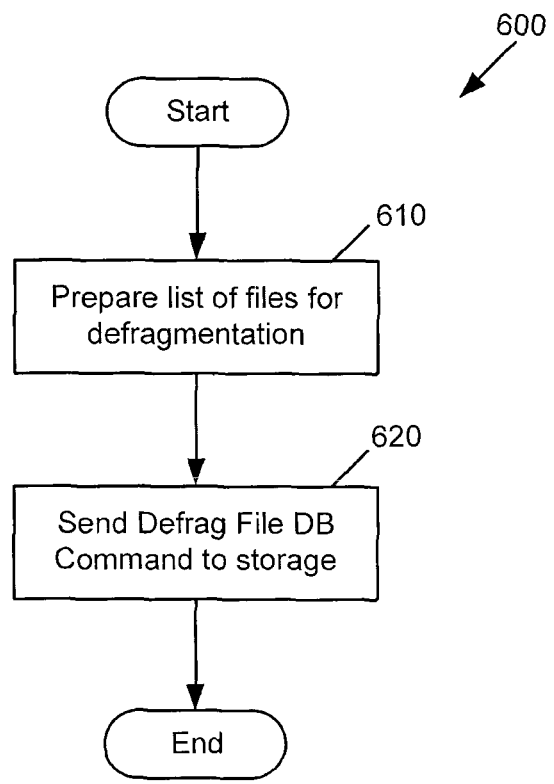
FIG. 6 is a flow chart of another method of an embodiment for reducing the fragmentation of a file without transferring the file between a storage module and a host.

Further optimization can be achieved if the host 240 sends list of files or a directory, with the host 240 optionally providing priorities and scheduling information. This embodiment is shown in the flow chart 600 of FIG. 6 and provides a more efficient operation that the one discussed above. As shown in FIG. 6, the host 240 prepares a list of files for defragmentation (optionally, with a priority list) (act 610) and then sends a defrag file database command to the storage module 100 (act 620). The storage module 100 parses the data base and plans the defragmentation process accordingly. During long idle times (e.g., at night time with the host (e.g., phone) is charging), the storage module 100 can perform defragmentation on the whole list of files according to the priority required by the host 340 and according to new and old metrics.

Irrespective of whether the host 240 communicates the files on a file-by-file basis (FIG. 5) or as a list/database (FIG. 6), the defragmentation operations of either method can be executed in a synchronic (blocking) or a synchronic (non-blocking) mode. In the synchronic mode, the storage module 100 will execute the command in the foreground and will release the busy signal only after finishing all the required operation. In contrast, in the asynchrony mode, the storage module 100 will keep the command in a non-volatile mode and will release the busy signal immediately. The executing of the command will be done in the background, preferably during idle time (e.g., during night time). The progress of executing can be communicated through a set of registers in the storage module 100 that the host 240 can poll.

The following chart is a high-level description of the commands and response arguments for this embodiment. Of course, this is merely one example, and other arguments can be used.

| Command Name | Command Arguments | Response Arguments |
| --- | --- | --- |
| Defrag File DB CMD - defrag list of files command | List of files, each has the following: LBA ranges File type (e.g., log, temp., JPG, OS) Mode (e.g., best effort or warranted) Priority Metric threshold | Completion status Fragmentation metric #1 . . . Fragmentation metric #K |

Figure 7:
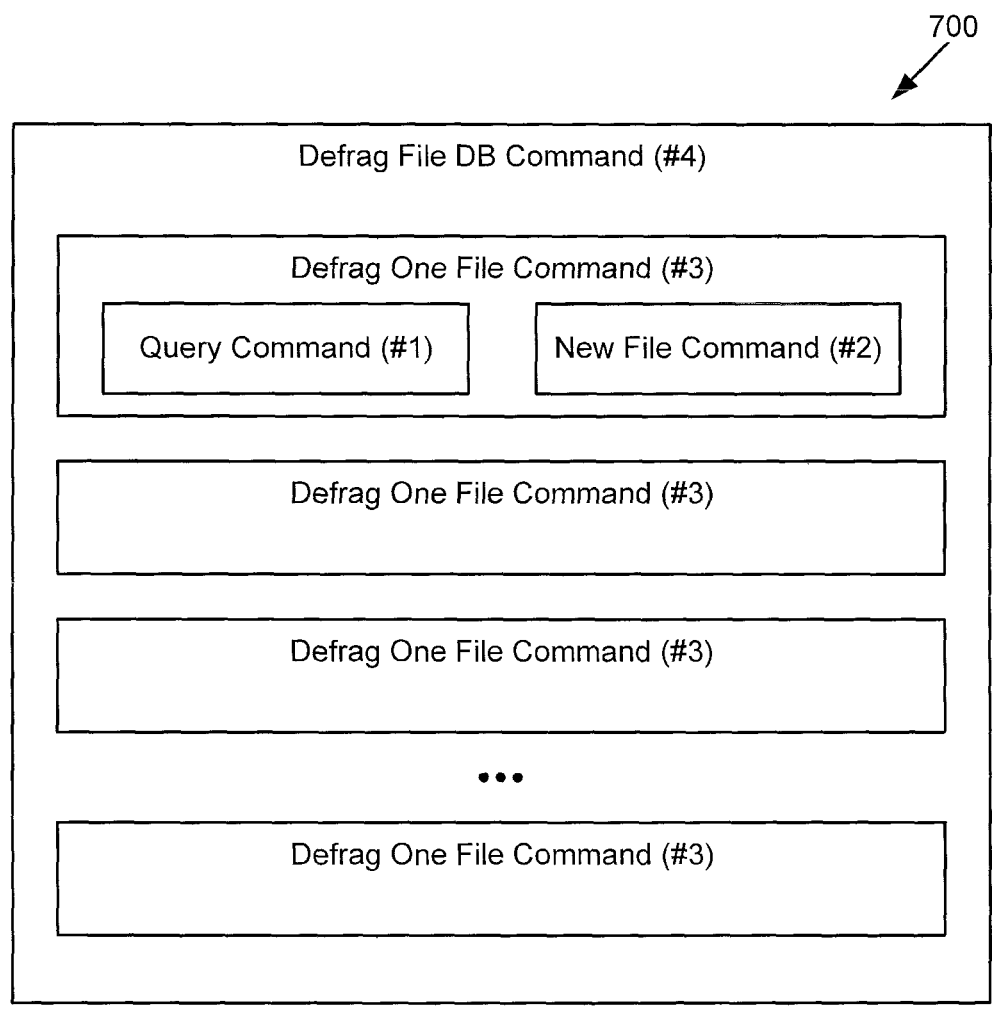
FIG. 7 is a chart summarizing various embodiments.

FIG. 7 is a chart that summarizes the relationships between the embodiments discussed above.

There are many alternatives that can be used with these embodiments. For example, in addition to or instead of moving the file to reduce storage device fragmentation, the host 340 can also use the received defragmentation metric to decide whether to activate host defragmentation. Unlike storage module fragmentation which focuses on physical blocks in the memory 120 of the storage module 100, host fragmentation focuses on the logical block address (LBA) ranges of a file. A host can address this problem by moving a scattered file to consecutive LBA ranges. However, if the file is fragmented across many physical blocks, host defragmentation can actually lead to worse performance than if the LBA ranges of the file were left as-is. So, by using this embodiment, the host 240 can base the determination of whether to perform host defragmentation on the storage module defragmentation metric.

Figure 8:
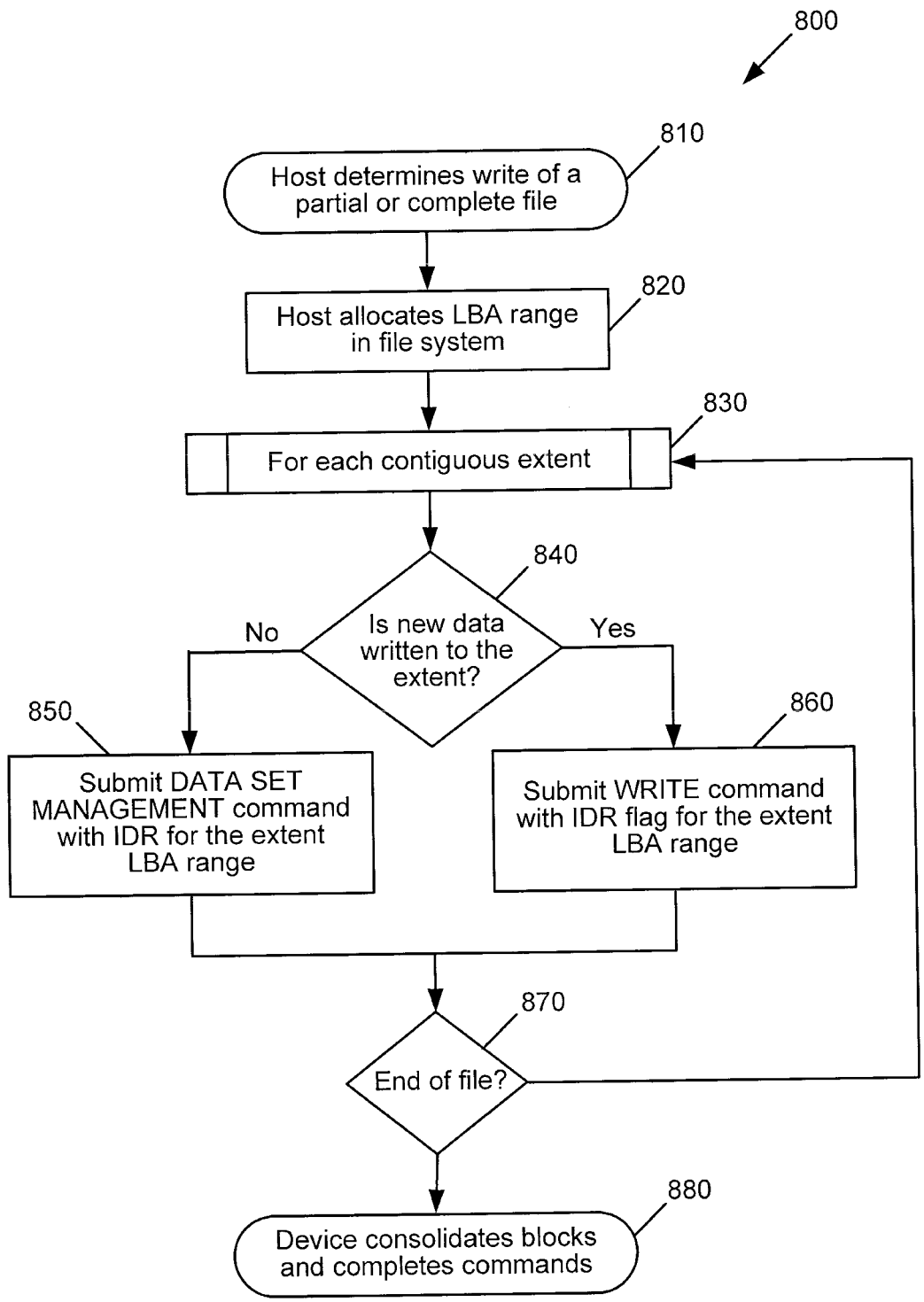
FIG. 8 is a flow chart of a method of an embodiment for a defragmentation technique that can be used with storage modules following the NVMe protocol.

In another embodiment, the defragmentation techniques discussed herein can be used with storage modules using the NVM Express (NVMe) protocol. Such storage modules can benefit from these embodiments by leveraging data set management commands that allow the host 240 to indicate to the storage module 100 when multiple non-consecutive LBA ranges are part of the same file. This uses the DATA-SET MANAGEMENT command and the Integral Read flag of the WRITE command in NVMe protocol. This embodiment will be discussed in more detail in conjunction with the flow chart 800 of FIG. 8, which describes a partial file write (or file update) using NVMe commands from the point of view of the host 240, in which the above embodiments are utilized on the storage module 100 side in order to offer improved performance.

As shown in the flow chart 800, the host 240 first determines that a write is to a partial or complete file (act 810). The host 240 then allocates or updates the allocation of an LBA range in the file system (act 820). Next, the host 240 performs a loop for each contiguous range of LBAs ("extent") (act 830). First, the host 240 determines whether there is new data written to the extent (act 840). If there isn't, the host 240 submits a data set management command with an integral read flag (IDR) for the extent LBA range (act 850). If there is, the host 240 submits a write command with an IDR flag for the extent LBA range (act 860). When the end of the file occurs (act 870), the storage module 100 consolidates blocks and completes the command (act 880). In this embodiment, the storage module 100 consolidates blocks as per the above embodiments before completing the dataset management commands issued by the host 240. The host 240 thus knows that the file is stored optimally.

Figure 10:
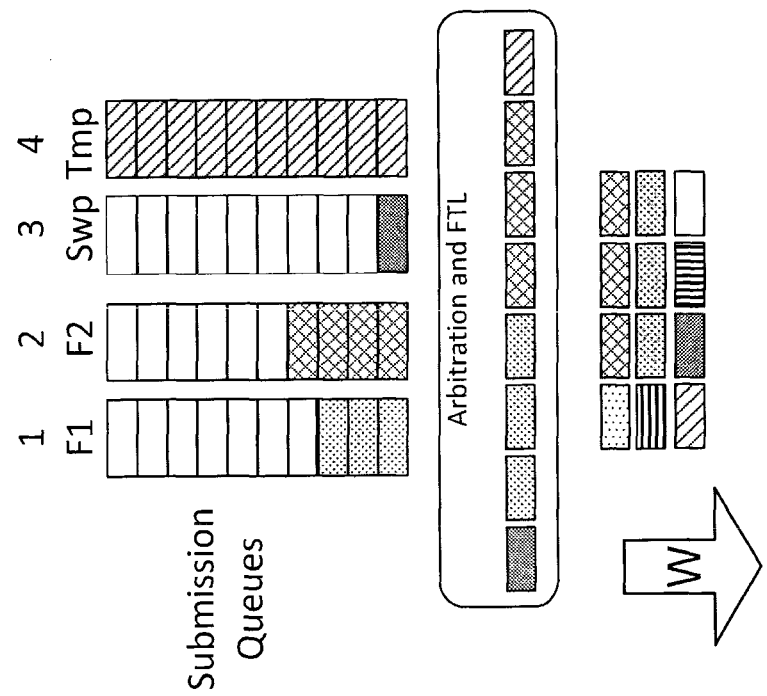
FIG. 10 is an illustration of an embodiment for writing files in a multiple queue environment when a defragmentation technique is used.
Figure 9:
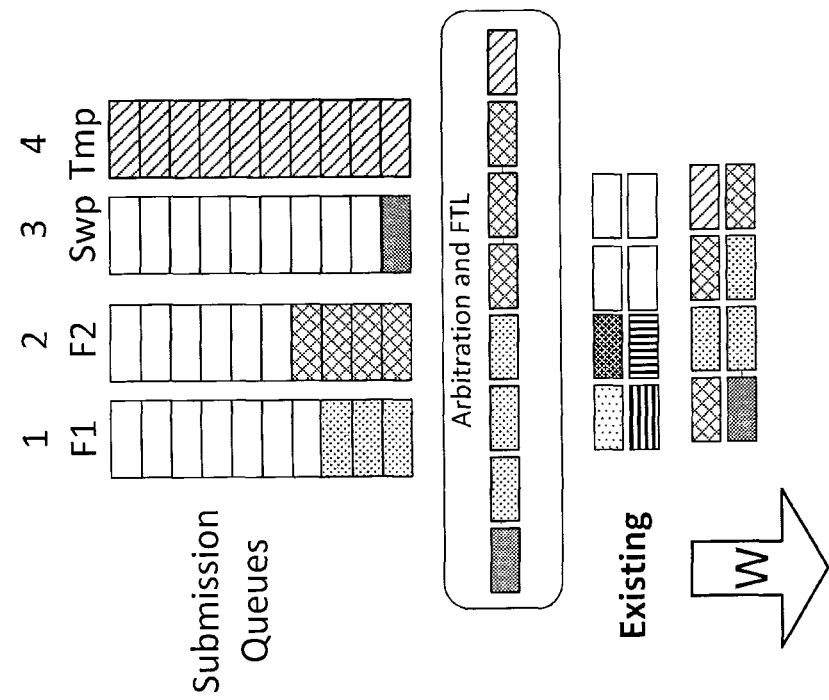
FIG. 9 is an illustration of an embodiment for writing files in a multiple queue environment.

A variation of this involves new file writes. Typically, new writes are programmed to the next available free block without regard for whether the following writes are part of the same sequence. When multiple files are written simultaneously using multiple queues, this can lead to the write interleaving shown in FIG. 9. In FIG. 9, the swap and temp queues (3 and 4) have write blocks interleaved with two files (F1 and F2). Each resulting page contains elements of multiple content types. (one represents existing content associated with file F1, and another represents existing content associated with F2.). By use of the consolidation technique discussed above, the storage module 100 can have a priori knowledge of the extent sequences of F1 and F2 since existing blocks belonging to the same LBA ranges have been marked as integrally written or consolidated. After consolidation, the resulting block allocation scheme can look like what is shown in FIG. 10. If this is done during the copy itself, storage module performance will suffer during the write process, since consolidation will have occurred during an I/O command. Thus, the storage module 100 may defer the consolidation until after the write completes, based on the data set management hints received during the write. Furthermore, the host 240 may send data set management commands to the given range after a write completes and achieve the same effect.

During a host-driven defragmentation cycle (as described above), the host 240 may send a data set management range table with the integral read flag in order to trigger consolidation. Typical SSDs can contain thousands of files, making sending individual data set management commands clumsy and inefficient. In another embodiment, the host 240 sends a command to the storage module 100 indicating LBA ranges that already contain extent lists that map to individual files (as is common in file systems). The storage module 100 then parses these extent lists and consolidates the files accordingly. The format of the extent list may match the structures found in file systems (such as FAT, NTFS, and HFS+) that utilize extent lists for fragmented files. The storage module 100 does not update the extent list autonomously but rather reorganizes the physical blocks indicated by the LBAs in each extent such that they are not physically fragmented.

It should be noted that in a highly-asynchronous protocol like NVMe and with the large number of fragmented extents found in a typical SSD, it may be easier for the storage module to just make the determination of fragmentation level of each file without informing the host of each file's fragmentation level. However, both the technique of reporting metrics back to the host prior to defrag and the technique of sending a hint on a specific sequence of extents can be used.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A host device comprising:
an interface through which to operatively communicate with a storage module; and
a controller operatively in communication with the interface, wherein the controller is configured to:
send a query to the storage module for a metric indicative of a fragmentation level of a file stored in the storage module, wherein the query comprises a first set of logical block addresses of the file;
receive a metric indicative of a fragmentation level of the file in physical blocks of memory in the storage module;
determine whether the metric is greater than a threshold; and
in response to determining that the metric is greater than the threshold:
send a command to the storage module to read the file;
receive the file from the storage module; and
send the file back to the storage module along with a write command comprising a second set of logical block addresses and a writing mode to use to write the file.

2. The host device of claim 1, wherein the writing mode comprises a best effort mode, in which the storage module makes its best effort to write the file using a minimum number of physical blocks.

3. The host device of claim 2, wherein the controller is further configured to provide the storage module with an indication of a type of the file, wherein an effort the storage module makes to write the file is based on the type of the file.

4. The host device of claim 2, wherein the controller is further configured to:
receive a metric indicative of a fragmentation level of the file written back to the storage module;
determine if the metric indicative of the level of fragmentation of the file written back to the storage module is greater than the threshold; and
if it is determined that the metric indicative of the level of fragmentation of the file written back to the storage module is greater than the threshold, instruct the storage module to use a warranted mode in which the storage module must write the file using the minimum number of physical blocks.

5. The host device of claim 1 wherein the writing mode comprises a warranted mode in which the storage module must write the file using a minimum number of physical blocks.

6. The host device of claim 1, wherein the metric comprises a number of physical blocks in the storage module containing the file.

7. The host device of claim 1, wherein the metric comprises a hot/cold indication.

8. The host device of claim 1, wherein the metric comprises a mapping efficiency indication.

9. The host device of claim 1, wherein the controller is further configured to:
send the storage module an indication that multiple non-consecutive logical block address ranges are part of a same file.

10. The host device of claim 9, wherein a command is used by the host device to indicate to the storage module when multiple non-consecutive logical block address ranges are part of the same file.

11. The host device of claim 9, wherein the indication that multiple non-consecutive logical block address ranges are part of the same file comprises a flag.

12. The host device of claim 1, wherein the memory of the storage module is a three-dimensional memory.

13. The host device of claim 1, wherein the storage module is embedded in the host device.

14. The host device of claim 1, wherein the storage module is removably connected to the host device.

15. The host device of claim 1, wherein the storage module is a solid-state drive.

16. A method for storage module defragmentation, the method comprising:
performing the following in a host controller operatively in communication with a storage module:

sending a query to the storage module for a metric indicative of a fragmentation level of a file stored in the storage module, wherein the query comprises a first set of logical block addresses of the file;

receiving a metric indicative of a fragmentation level of the file in physical blocks of memory in the storage module;

determining whether the metric is greater than a threshold; and in response to determining that the metric is greater than the threshold:

sending a command to the storage module to read the file;

receiving the file from the storage module; and sending the file back to the storage module along with a write command comprising a second set of logical block addresses and a writing mode to use to write the file.

17. The method of claim 16, wherein the writing mode comprises a best effort mode, in which the storage module makes its best effort to write the file using a minimum number of physical blocks.

18. The method of claim 17 further comprising providing the storage module with an indication of a type of the file, wherein an effort the storage module makes to write the file is based on the type of the file.

19. The method of claim 17 further comprising:

receiving a metric indicative of a fragmentation level of the file written back to the storage module;

determining if the metric indicative of the level of fragmentation of the file written back to the storage module is greater than the threshold; and if it is determined that the metric indicative of the level of fragmentation of the file written back to the storage module is greater than the threshold, instructing the storage module to use a warranted mode in which the storage module must write the file using the minimum number of physical blocks.

20. The method of claim 16, wherein the writing mode comprises a warranted mode in which the storage module must write the file using a minimum number of physical blocks.

21. The method of claim 16, wherein the metric comprises a number of physical blocks in the storage module containing the file.

22. The method of claim 16, wherein the metric comprises a hot/cold indication.

23. The method of claim 16, wherein the metric comprises a mapping efficiency indication.

24. The method of claim 16 further comprising:

sending the storage module an indication that multiple non-consecutive logical block address ranges are part of a same file.

25. The method of claim 24, wherein a command is used by the host controller to indicate to the storage module when multiple non-consecutive logical block address ranges are part of the same file.

26. The method of claim 24, wherein the indication that multiple non-consecutive logical block address ranges are part of the same file comprises a flag.

27. The method of claim 16, wherein the memory of the storage module is a three-dimensional memory.

28. The method of claim 16, wherein the storage module is embedded in a host containing the host controller.

29. The method of claim 16, wherein the storage module is removably connected to a host containing the host controller.

30. The method of claim 16, wherein the storage module is a solid-state drive.

31. A host device comprising:

an interface through which to operatively communicate with a storage module;

means for sending a query to the storage module for a metric indicative of a fragmentation level of a file stored in the storage module, wherein the query comprises a first set of logical block addresses of the file;

means for receiving a metric indicative of a fragmentation level of the file in physical blocks of memory in the storage module;

means for determining whether the metric is greater than a threshold; and means for in response to determining that the metric is greater than the threshold:

sending a command to the storage module to read the file;

receiving the file from the storage module; and sending the file back to the storage module along with a write command comprising a second set of logical block addresses and a writing mode to use to write the file.

* * * * *